J. H. Van Nortwick,
Wind Wheel.
Nº 76,561. Patented Apr. 7, 1868
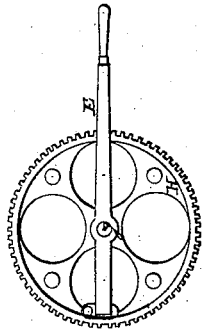
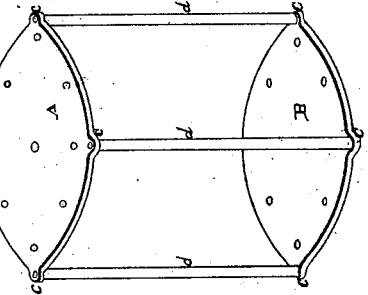
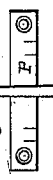
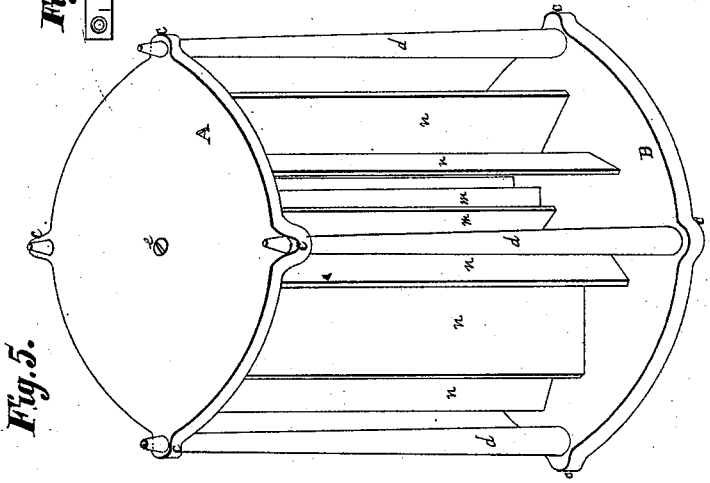
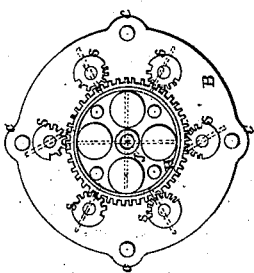
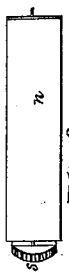
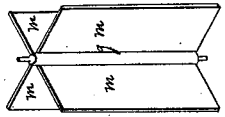
Witnesses
Jno. A. Ellis
J. W. Whister
Inventor
J. H. Van Nortwick
P. H. Alexander
Atty.

United States Patent Office.

JAMES H. VAN NORTWICK, OF STURGIS, MICHIGAN.

Letters Patent No. 76,561, dated April 7, 1868.

---

IMPROVEMENT IN WINDMILLS.

---

The Schedule referred to in these Letters Patent and making part of the same.

---

TO ALL WHOM IT MAY CONCERN:

Be it known that I, JAMES H. VAN NORTWICK, of Sturgis, in the county of St. Joseph, and State of Michigan, have invented certain new and useful Improvements in Wind-Wheels; and I do hereby declare that the following is a full, clear, and exact description thereof, reference being had to the accompanying drawings, and to the letters of reference marked thereon, which form a part of this specification, in which—

Figure 1 is a plan view of the external surface of the plane of my wind-wheel.

Figure 2 is a plan view of one of the wings, with pinion attached.

Figure 3 is a view of the main shaft, with the wings attached.

Figure 4 is a plan view of main or driving-wheel, with lever attached.

Figure 5 is a perspective of the frame of my machine when viewed at an angle above its upper surface.

Figure 6 is a similar view of the same, with the wings removed.

Figure 7 is a plan view of the spring, and plate to which said spring is fastened.

The frame of my machine consists of the circular top A and bottom B, furnished with circular projections, C. The top and bottom are held together by four ties, $d$, which pass through the projections or ears $c$, as seen in fig. 5. $g$ designates a vertical shaft, which is pivoted at its upper end in screw $e$, which passes through the top, A. At its lower end the said shaft rests in a metal box, which is placed in the centre of the upper surface of bottom, B. To shaft $g$ are attached the four wings $m$, which are placed equidistant apart. $n$ represents a series of wings, which are pivoted at top to A. and passing at bottom through B. The rounded neck of each wing, $n$, projects sufficiently far below the surface of B to have the pinion $s$ attached to it, the said pinions being supplied with cogs only on half their circumference, (see fig. 1.) These several pinions are operated by driving-wheel H. The driving-wheel H is pivoted at the centre of B, and being geared into all the pinions $s$, the whole of the pinions, and the wings to which they are attached, will be operated at the same moment. In order to adapt the wings $n$ to the direction of the wind, the lever E is fastened to the projecting centre of wheel H. The moving of the said lever moves the driving-wheel to the desired position, and as the driving-wheel acts on the pinions $s$, and the wings $n$, to which said pinions are attached, the said wings will be placed in the position desired by the operator. To keep the lever stationary when placed in the proper place, a spring, $a$, is provided, (see fig. 7.) The said spring is fastened to the plate $p$, at right angles with said plate, and bolted to the under surface of B; the spring $a$ being directly under the lever E. Several indentations are in plate $p$, into any one of which the spring $a$ can rest, and thus be prevented from moving. A vertical shaft can be coupled with the shaft $g$, with a drum on it to give motion to the required machinery.

The great advantage I claim for my wind-wheel is the facility with which the wings can be adapted to the direction of the wind.

Having thus described my invention, what I claim as new, and desire to secure by Letters Patent, is—

The combination and arrangement of wind-wheel $m$, wings $n\ n$, pinions $s\ s$, wheel H, lever E, spring $a$, and plate $p$, or its equivalent, substantially for the purpose described.

In testimony that I claim the foregoing as my own, I affix my signature in presence of two witnesses.

JAMES H. VAN NORTWICK.

Witnesses:
JOHN A. DICE,
FRANK HIBBARD.